United States Patent [19]

Hickman

[11] Patent Number: 5,452,017
[45] Date of Patent: Sep. 19, 1995

[54] METHOD AND APPARATUS FOR ELECTRONIC IMAGE COLOR MODIFICATION USING HUE AND SATURATION LEVELS

[76] Inventor: Charles B. Hickman, 2890 Topaz Ave., Simi Valley, Calif. 93063

[21] Appl. No.: 328,533

[22] Filed: Oct. 25, 1994

Related U.S. Application Data

[63] Continuation of Ser. No. 999,205, Dec. 31, 1992, abandoned.

[51] Int. Cl.$^6$ .............................................. H04N 9/64
[52] U.S. Cl. ................................. 348/646; 348/651; 348/703; 358/520
[58] Field of Search ............................... 395/131, 132; H04N 9/64; 348/649–651, 645–647, 703; 358/520

[56] References Cited

U.S. PATENT DOCUMENTS

| | | |
|---|---|---|
| 4,183,046 | 1/1980 | Dalke et al. . |
| 4,951,127 | 8/1990 | Mehrgardt et al. . |
| 5,089,882 | 2/1992 | Kaye et al. . |
| 5,134,465 | 7/1992 | Ohki et al. . |
| 5,202,935 | 4/1993 | Kanamori et al. . |
| 5,204,948 | 4/1993 | Kato . |

*Primary Examiner*—Victor R. Kostak
*Assistant Examiner*—John W. Miller
*Attorney, Agent, or Firm*—Blakely, Sokoloff, Taylor & Zafman

[57] ABSTRACT

The color modification system receives standard red, green and blue signal values and outputs modified red, green and blue values in accordance with operator modification of the signals. To increase processing speed and minimize the amount of required memory while also maintaining high resolution, the system converts the input red, green and blue signals to two-component hue and saturation values for modification using look-up tables. Once the hue and saturation levels of the signals are modified, red, green and blue output signals are reconstructed using the modified hue and saturation values, as well as a calculated brightness value. In this manner, modification of three-component primary-color signals is achieved by manipulating only two-component hue and saturation values. The system also allows modification of the brightness level of each component of the video signal in accordance with operator control. Novel methods for the determination of hue and saturation are disclosed.

20 Claims, 3 Drawing Sheets

METHOD AND APPARATUS FOR ELECTRONIC IMAGE COLOR MODIFICATION USING HUE AND SATURATION LEVELS

This is a continuation of application Ser. No. 07/999,205 filed Dec. 31, 1992, now abandoned.

BACKGROUND OF THE INVENTION

1. Field of the Invention

The present invention generally relates to video or electronic image signal processing, and in particular to techniques for modifying the hue and/or saturation levels of video signals with hue/saturation/brightness directed brightness range changes.

2. Description of Related Art

A wide variety of techniques and systems have been developed for processing electronic or video image signals to add, delete or modify color components of the signals, usually in accordance with operator control. For example, systems have been developed for emphasizing or deemphasizing selected colors or hues within an entire video image signal or within selected portions of the signal. Other systems have been developed for adding color information to an otherwise monochromatic or black and white image.

Conventional systems typically store and manipulate blue, green and red primary color components of an electronic image to allow color modification of either the entire image or portions thereof. To this end, look-up tables are often provided in the memory of the system for converting the primary color components from one brightness or luminance level to another, to thereby modify the resulting hue of the electronic image. An example of the system providing look-up tables for blue, green and red primary colors is set forth in U.S. Pat. No. 4,639,771 to Hattori, et al. Systems which allow for modification of colors within only a portion of an electronic image or video signal include U.S. Pat. No. 4,782,384 to Tucker, et al and U.S. Pat. No. 4,710,800 to Fearing, et al.

Most conventional systems which allow for storage and manipulation of primary color based signals do not operate in real time. Hence, an operator must page through a video signal one frame at a time while varying the colors or hues in each frame. Even if designed to operate without direct operator control, such systems typically process the video signal at a delayed rate. Accordingly, such systems are time consuming and, if operator control is required throughout the process, labor intensive. Thus, such systems are relatively expensive to operate. Furthermore, systems which store and manipulate the individual primary color components of each video display pixel require extensive amounts of computer memory which may be expensive and may further slow the processing time of the video signal. The memory requirements of such a system may be seen by considering the simplified color manipulation system of FIG. 1 which includes input lines for receiving digitized image elements, such as red, green and blue primary color elements, luminance and chromonance elements, or other discrete image elements. Each digitized element is processed by a programmable look-up table which provides an array of values for converting the input elements to obtain desired modified output elements in accordance with operator instructions received through a user interface.

Although the method outlined with reference to FIG. 1 is a simple and viable method for manipulating color image signals, a significant drawback to the method is the amount of memory required within the look-up table. With each of the three input image elements represented by 8 bits, the look-up table may require more than fifty million 8 bit bytes of stored information. The processing time required to access and manipulate the data stored within the look-up table prevents the system from operating effectively in real time. Further, the large amount of memory adds additional costs to a system employing the technique of FIG. 1. To limit the memory requirements, many present systems represent each primary color by only 4-bits, thereby achieving only limited resolution.

As can be appreciated, there is a need to provide a system for allowing color modification of an input video image which uses a limited amount of memory and which is capable of operating in real time.

SUMMARY OF THE INVENTION

These objects, and other general advantages of the invention, are achieved by the provision of an apparatus for processing video color signals comprising a means for receiving a plurality of primary color based three component input color signals; means for converting each of the three component input signals to corresponding two component signals based only on hue and saturation levels; means for modifying, in accordance with operator input, the two component hue and saturation levels; means for determining a brightness factor corresponding to each of the input signals; and a means for converting the modified two component hue and saturation signals to three component primary color based output signals using the modified hue and saturation levels and using the brightness factor.

By converting the three component primary color based signals to two component hue and saturation signals, the video image is stored and manipulated in real time using only a limited amount of memory. In other words, by reducing the signal to two component hue and saturation levels, instead of three component blue, green and red levels, look-up tables required to process the signals require far fewer entries and are thereby substantially smaller and can be accessed faster.

In accordance with a preferred embodiment of the invention, the means for converting the input signals to the corresponding hue and saturation signals comprises a means for ordering the component signals into HIGH, MIDDLE and LOW signals according to their relative magnitudes; a means for determining a hue value based on a comparison of only the HIGH minus LOW and MIDDLE minus LOW signals; and a means for determining the saturation value based on a comparison of only the LOW and HIGH signals. Additionally, means are provided for calculating the brightness factor based solely on the HIGH signal value. Look-up tables are provided for mapping the hue and saturation levels into modified hue or saturation levels based on preprogramming or based on direct operator control. Once the hue and saturation levels are modified, three component primary color based signals are recreated from the modified hue and saturation signals using the brightness factor.

Also in accordance with the preferred embodiment of the invention, additional means may be provided for allowing an operator to define certain zones within the hue and saturation chromatic spectrum whereby all image components having a hue or saturation within a selected range are modified, without affecting the remaining components which do not fall within the preselected hue or saturation ranges. Further, a means is provided for varying the brightness factor either for all components of the image signal or for components having hues or saturations within the preselected zones.

Also in accordance with the invention, a method is provided for manipulating video signals using the technique embodied within the above described apparatus. By converting a three-component color signal to a two-component hue and saturation signal, memory requirements are reduced, processing speed is increased, and high resolution is maintained. The invention can be advantageously exploited with a variety of conventional video color processing systems to enhance the speed of the systems or can be developed within a standalone system.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE PREFERRED EMBODIMENT

An improved color electronic image processing system and method is disclosed. In the following description for purpose of explanation, numerous details are set forth to provide a thorough understanding of the present invention. However, it will be apparent to one skilled in the art that these details are not required in order to practice the present invention. In other instances, well known structures and circuits are shown in block diagram form in order not to obscure fundamental aspects of the invention.

Figure 1:
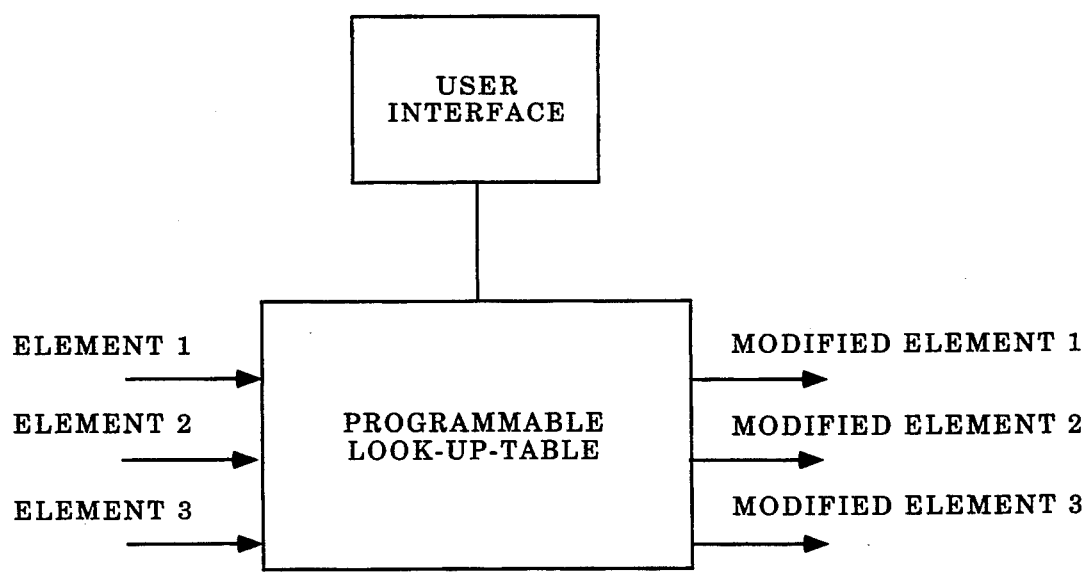
FIG. 1 provides a functional block diagram of a simplified video image processing system for modifying three component video input signals utilizing a memory look-up table.
Figure 2:
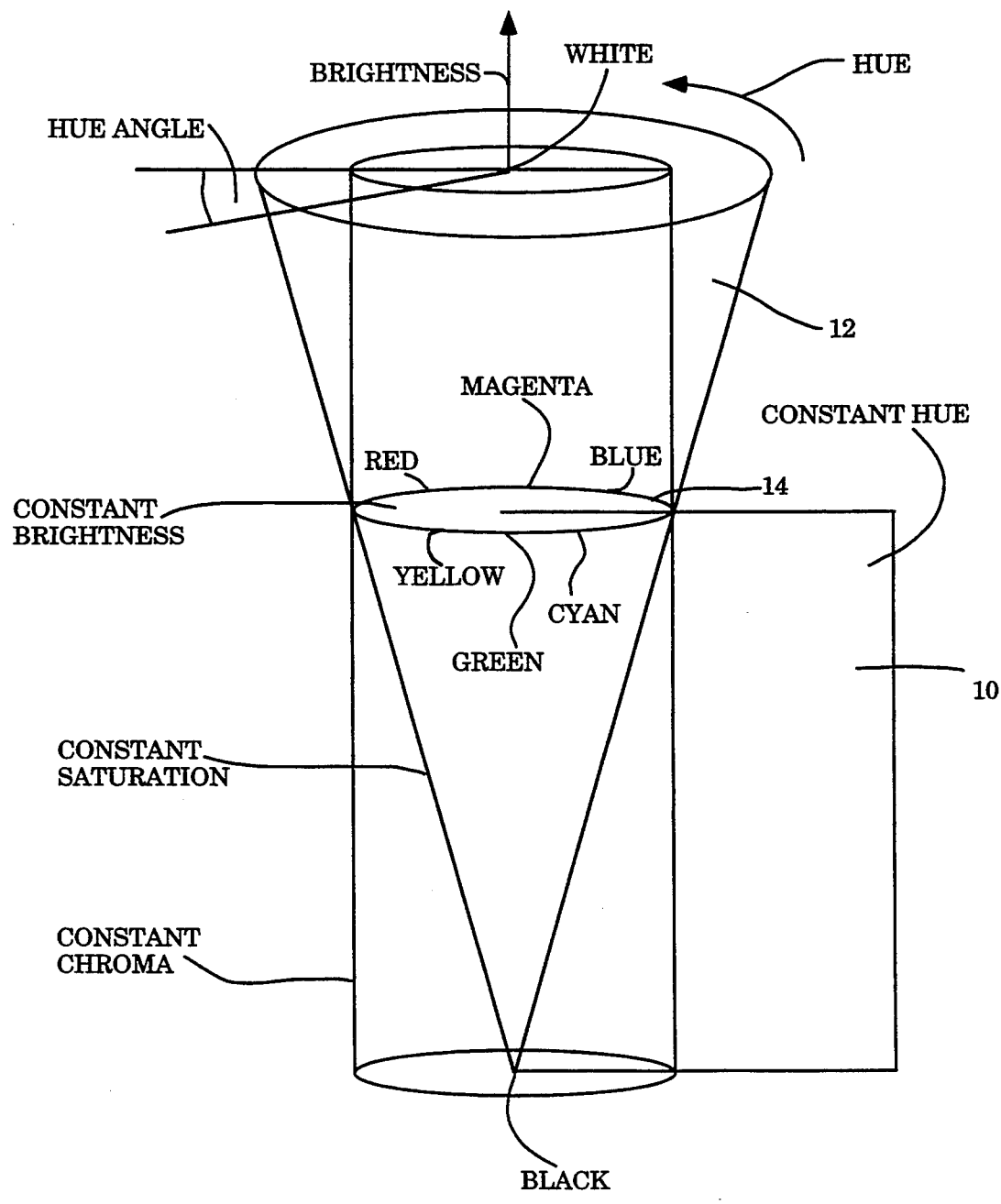
FIG. 2 provides a geometrical representation of perceptual color space for electronic additive images.

Referring to FIG. 2, a geometrical representation of perceptual color space for color electronic additive images is provided. The figure provides representation of hue, saturation and image brightness as it is perceived by one viewing an electronic image. Hue is a more precise term for what is normally referred to as color. Hue corresponds to dominant frequency or wavelength of the image, and is represented by terms such as red, green or yellow. Saturation refers to the dilution of the image with white. Saturation is usually described in terms of pale or vivid.

Although there are hundreds of different hue and saturation combinations that can be perceived by the human eye, almost all combinations of hue and saturation can be duplicated by blending suitable amounts of three primary colors. For electronic color images, additive primary colors are utilized, rather than subtractive primary colors (which are employed in color printing). The additive primary color are red, green and blue. Blending red and green produces yellow, blending green and blue produces cyan, and blending red and blue produces magenta. Yellow, cyan and magenta are referred to as additive complementary colors. A blend of each of the primary colors yields a degree of saturation by white. A fully saturated color has no dilution with white. Full saturation occurs only when one or two of the additive primary colors is absent from a signal. If all three additive primary colors are represented in equal proportions, the resulting image is pure white. In addition to hue and saturation, an additive color signal includes a brightness factor representing the intensity or luminance of the signal.

FIG. 2 provides a geometrical representation of the relationships between hue, saturation and brightness. In FIG. 2, the brightness of the image increases vertically, with an image having no brightness being purely black. Plane 10 represents a plane of constant hue. Hence, all image components occurring within plane 10 share a common hue. Cone 12 provides a cone of constant saturation, such that all image components occurring on the surface of cone 12 are equally saturated by white. A plane extending through circle 14 represents a plane of constant brightness or luminance. Thus, all image components existing within a plane extending through circle 14 have equal image component brightness. Circle 14 thus provides a chromatic circle representing all hues at a constant level of brightness and constant level of saturation. As can be seen from FIG. 2, chromatic circle 14 includes the primary additive colors blue, green and red and the complementary additive colors cyan, magenta and yellow. A particular hue is represented in FIG. 2 by a hue angle.

Figure 3:
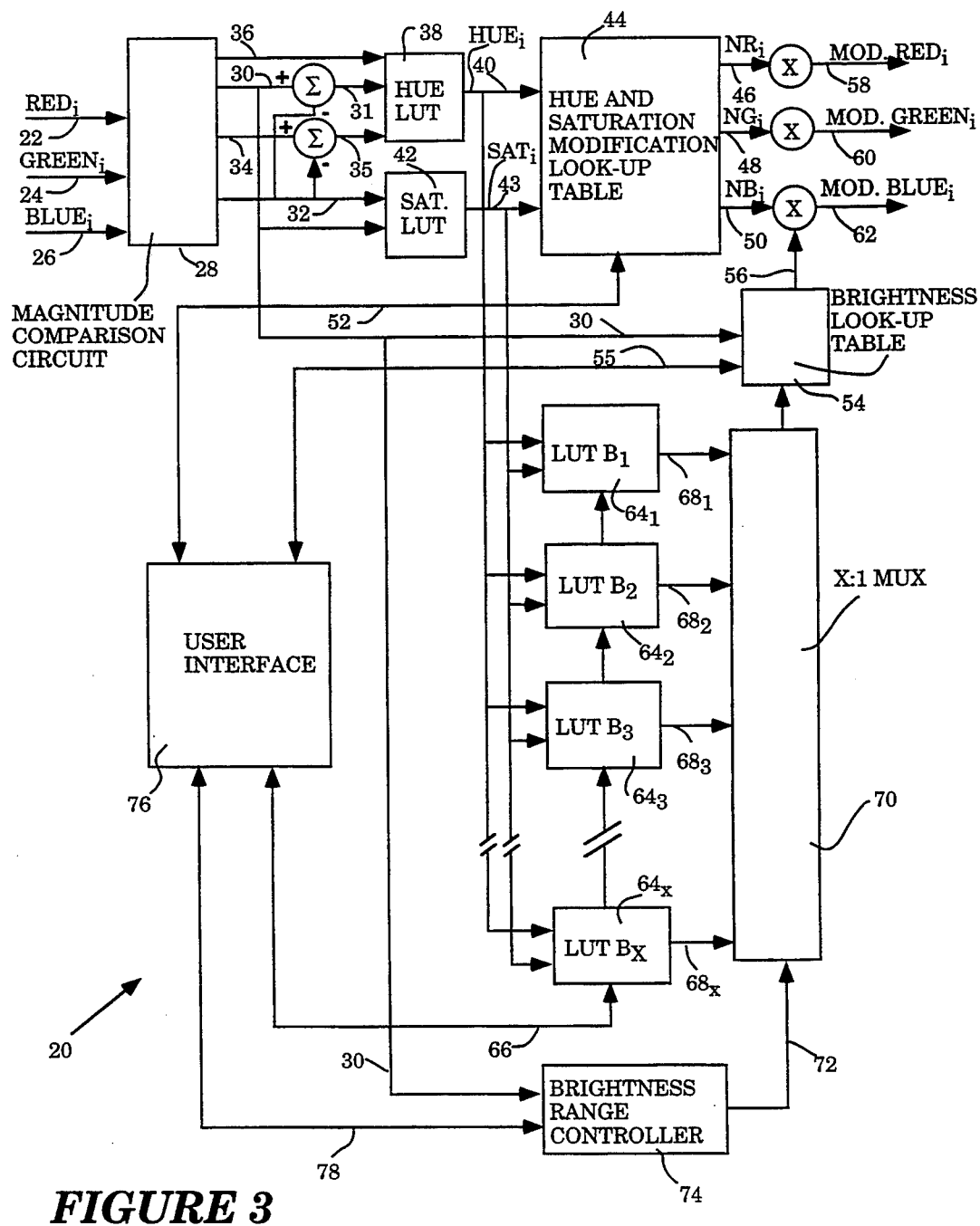
FIG. 3 provides a functional block diagram of a color image processing system constructed in accordance with a preferred embodiment of the invention.

With these definitions in mind, the invention is best understood with reference to FIG. 3. FIG. 3 provides a functional block diagram of a computer based electronic image modification circuit 20 designed for processing and manipulating a color input image. The input color image is received along input data lines 22, 24 and 26, corresponding to red, green and blue components of the input signal. Primary color components of the input signal are represented by $R_i$, $G_i$, and $B_i$, corresponding to red, green and blue image elements for pixels. Input signals $R_i$, $G_i$, and $B_i$ are preferably represented by 8 bit data bytes scaled between 0 and 100 IRE, wherein IRE represents a conventional standardized video signal magnitude, with 140 IRE being equal to 1 $V_{pp}$. However, other numerical representations of the strength or magnitude of the video input signals may be utilized. Indeed, even other primary color combinations other than red, green and blue may be utilized consistent with the principles of the invention.

Input signals received along data lines 22, 24 and 26 are processed by a magnitude comparison circuit 28 which orders each trio of red, green and blue signals according to relative magnitude. Magnitude comparison circuit 28 outputs the primary color component having the greatest magnitude on data line 30. This component is referred to as the HIGH component. The primary color component having the lowest magnitude is output along data line 32, and is referred to herein as the LOW signal. The remaining primary color component is output along data line 34, and is referred to herein as the MIDDLE component. Thus, for a particular set of primary color inputs $R_i$, $G_i$, and $B_i$, with respective IRE values of 75, 50 and 25, the IRE value 75 for the red signal is output as the HIGH signal along data line 30, the IRE value 50 corresponding to the green signal is output as the MIDDLE signal along line 34 and an IRE value of 25 is output along data line 32 as the LOW signal. Thus, only the IRE magnitude value is output along data lines 30, 32 and 34.

Magnitude comparison block 28 also outputs a signal representing the color relationships of the HIGH, MIDDLE and LOW signals. Thus, if the HIGH signal is red and the MIDDLE signal is green, the indicator output along data line 36 represents a red-green combination. If on the other hand, the HIGH signal were blue and the MIDDLE signal red, the indicator output along line 36 provides an appropriate indication in three data bits. Two bits are used to indicate the one-third sectors of circle 14 involved; i.e., red-green, red-blue or blue-green sector. These two bits are passed unmodified directly through as the two most significant bits of hue 40. The third bit represents direction from HIGH to MIDDLE. Thus, a red-green combination is different from a green-red combination. The third bit is inputted to the hue look-up table along with 16 other data bits along data lines 31 and 35 to determine the hue angle which is between 0 and 120 degrees.

Hue look-up table 38 receives the HIGH and MIDDLE signals after white has been removed along lines 31 and 35 and the relative color indicator along line 36. Hue look-up table 38 determines the hue of the input signal based solely on the relative magnitudes of the HIGH minus LOW received along data line 31 (HIGH1) and MIDDLE minus LOW received along data line 35 (MIDDLE1) signals in combination with the three-bit color indicator signal. The summers represented in FIG. 3 each subtract one low value from another high value. The summers do not function as accumulators.

Hue look-up table 38 exploits the fact that only the two dominant primary colors after white is removed are required for determining hue. With color component magnitudes represented on a scale of 0 to 100 IRE expressed in 8 data bits, hue look-up table 38 may contain a 256×256×2 array of values. With a unique hue value stored for each combination of a HIGH1 signal value, a MIDDLE1 signal value, and an indicator value. Thus, two different values may be stored depending upon whether the HIGH1 and MIDDLE1 signal values represent a red-green, green-red; red-blue, blue-red; or green-blue, blue-green combination). The number of values in hue look-up table 38 representing gradations of HIGH1 and MIDDLE1 signal values may be pre-programmed as desired. Thus, rather than providing a 256×256 array of HIGH and MIDDLE signal values, hue look-up table 38 may instead provide a 128×128 array, etc. In like manner, all look-up tables herein may contain more or fewer data bits as resolution requirements dictate.

Within hue look-up table 38, the hue values are preferably represented with 8-bits as hue angles defined in the chromatic circle 14 shown in FIG. 2. However, other numeric representations of hue may be used as desired. In any case, the particular hue values corresponding to various combinations of HIGH and MIDDLE signal values are pre-programmed. These values may be initially determined in accordance with the conventional principles of additive colors.

With suitable pre-programming a hue values, hue look-up table 38 inputs HIGH1 and MIDDLE1 signal values, such as 50 and 25 IRE respectively, and the indicator value, and determines a unique hue angle for outputting along data line 40 (line 40 contains two data bits from line 36).

A saturation look-up table 42 receives the HIGH and LOW signal values along lines 30 and 32 respectively for determining the saturation of the signal. As noted above, saturation is defined as the amount of white diluting a hue. Equal amounts of red, green and blue yield pure white. If, however, at least one of the primary colors is completely absent, then the color is completely saturated and contains no white. Thus, the primary color having the smallest magnitude determines the amount of saturation when compared with the primary color having the largest magnitude. Accordingly, saturation look-up table 42 receives numeric values for the HIGH and LOW signals and outputs an 8-bit saturation value along data line 43. In accordance with conventional terminology, a color having no white is defined as being one-hundred-percent saturated. Accordingly, a saturation percentage may be calculated by subtracting a ratio of the LOW and HIGH signals from 1 and converting to a percentage. With the HIGH and LOW signal values represented on scales from 0 to 100 IRE expressed in 8 data bits, saturation look-up table 42 may comprise a 256 by 256 array with a unique saturation value pre-programmed for each unique ratio combination of HIGH and LOW values. However, saturation look-up table 42 may be alternatively replaced with a circuit element capable of performing the above-described calculation. The technique allowing the fastest conversion of the HIGH and LOW signal values to a saturation value is preferred.

Hue and saturation values output along lines 40 and 43 are received by a hue and saturation modification programmable look-up table 44. Modification look-up table 44 converts the hue and saturation values to normalized red, green and blue signal values for outputting along data lines 46, 48 and 50. Conversion to normalize the red, green and blue is conducted in accordance with user input received along input line 52. Data line 52 provides two-way data communication to allow for a self-check of memory.

Modification look-up table 44 provides an array of values for each combination of hue and saturation values. Each element of the array includes three stored values corresponding to normalized red, green and blue signals. Thus, these elements relate a particular combination of hue and saturation to corresponding normalized red, green and blue values. The red, green and blue values of modification look-up table 44 are referred to as being "normalized" because they do not contain any brightness information. Brightness information is not available to modification look-up table 44 because brightness information is lost as the input red, green and blue values are converted to hue and saturation values. By excluding brightness information, and representing the input signal merely as a two-component hue and saturation signal, the number of elements required in modification look-up table 44 is greatly reduced. Furthermore, by providing a digital look-up table, non-linear modification of the color signal is achieved. This is an improvement over prior art analog systems which may only be capable of linear modification.

Modification look-up table 44 is preferably a 256×256 array pre-programmed with suitable normalized red, green and blue values corresponding to each combination of hue and saturation values. However, the values contained within look-up table 44 are modifiable by an operator or user via input line 52. In this manner, an operator is able to modify the hue or saturation levels of the signal to achieve a desired output. User input may be achieved by any conventional input device, such as a computer keyboard and CRT. As the user interface may be entirely conventional, the user interface will not be described herein in further detail.

Thus, look-up table 44 outputs modified normalized red, green and blue values, with 8-bits each, with the hue and saturation levels of those values being modified in accordance with operator commands. To reconstruct an unnormalized red, green and blue output signal, the brightness information originally extracted from the input red, green and blue values must be re-incorporated into the output signals. To this end, a brightness look-up table 54 is provided which receives the HIGH signal value along data line 30. With primary color values limited to 100 IRE, the overall brightness of the signal is merely the ratio of the primary color having the largest magnitude to 100 IRE. Accordingly, look-up table 54 provides a vector array having a single brightness factor value, represented by 8-bits for each input value of the HIGH signal. Hence, with the HIGH signal represented on a scale of 0 to 100 IRE, the vector array of look-up table 54 merely provides a discrete brightness factor value, preferably between 0 and 1, for each IRE value between 0 and 100. However, brightness look-up table 54 may compress, expand and/or shift the brightness value as specified by user input received along data line 55. Look-up table 54 may be replaced with circuitry capable of converting the HIGH signal value to a brightness factor in accordance with the previously described relationship.

The brightness factor provided along line 56 is multiplied by each of the normalized red, green and blue signals provided along lines 46, 48 and 50 to achieve unnormalized modified output values along lines 58, 60 and 62 respectively. In FIG. 3, the unnormalized modified output values are represented by MOD.RED$_i$, MOD.GREEN$_i$, and MOD.BLUE$_i$.

Thus far described, the system of FIG. 3 provides an efficient apparatus for allowing an operator to modify the hue and saturation levels of an electronic video image, initially represented in terms of red, green and blue components. By converting the three-component primary color input values into two-component hue and saturation values, less memory is required while maintaining high resolution and execution times are enhanced over systems which directly manipulate the three-component primary color values. Furthermore, by extracting brightness and representing hue and saturation by a full 8-bits throughout the system, high resolution is maintained. With hue and saturation each represented by 8-bits, a resolution of better than 0.5% is achieved. Look-up tables are utilized to achieve maximum processing speed. Although described in terms of a single trio of red, green and blue input values, the apparatus of FIG. 3 sequentially operates on thousands of red, green and blue input values for each frame of a video image. To further increase processing speed, parallel processing technologies may be employed to simultaneously process two or more pixels of an input electronic color image.

Remaining components set forth in the FIG. 3 provide additional means for allowing an operator to modify the hue and saturation levels of the video image. In particular, to allow an operator to efficiently modify selected ranges of hue and saturation values, a set of zone look-up tables 64$_1$, 64$_2$, . . . 64$_x$ are provided. Each zone look-up table receives 8-bit hue and saturation values along data lines 40 and 43 from hue and saturation look-up tables 38 and 42, respectively. Each look-up table 64, preferably comprising a 256×256 array, compares the received pair of hue and saturation values with user-defined or pre-programmed hue and saturation ranges to determine whether the received values fall within pre-programmed zones. A zone may represent a range of hues from, for example, red to blue, represented in terms of hue angles. Alternatively, a zone may represent a range of saturation values from, for example, 50 to 75 percent. A zone may also incorporate both hue and saturation range values.

Operator definition of the various zones is received along either input line 66. In use, an operator or user using conventional input device 76 defines sets of zones. During processing, look-up tables 64 compare each combination of hue and saturation values to determine whether those values occur within the operator-defined zones.

Zone information is output along data lines 68$_1$, 68$_2$, 68$_3$ . . . 68$_x$ to a multiplexer 70. Multiplexer 70 additionally receives one or more brightness factor range values along MUX address control line 72 from a brightness range controller 74. As with brightness look-up table 54 described above, brightness range controller 74 receives the HIGH signal values along line 30 from magnitude comparison block 28. Operator input is received from a user interface 76 via interface line 78. With user interface 76, a user or operator may input selected brightness factors for use with each of the operator-defined zones, for use in expanding, contracting, and/or shifting the brightness factors. Multiplexer 70 combines the brightness range information with the zone information and outputs the combined data to brightness look-up table 54 for direct modification of the brightness factors provided within look-up table 54. In this manner, an operator has flexible control over the brightness values used in reconstructing the output signal. This feature is provided for user flexibility and for perception reasons, e.g., to help compensate for a problem in visual perception wherein two images having identical hue and saturation but significantly different brightness are perceived by an observer as having a different hue and saturation; or the user may choose to lighten or darken a group of hue/saturation selections. By allowing the operator to modify the brightness factors for entire ranges or zones of hue and saturation values, the output signal can be adjusted by the operator to compensate for the perception of the output image.

What has been described is a system for allowing an operator to efficiently modify a color electronic image to vary the hue, saturation or brightness values of components of the image or of the entire image. While certain exemplary embodiments have been described and shown in the accompanying drawings, it is to be understood that such embodiments are merely illustrative of and not restrictive on the broad invention, and that this invention is not to be limited to the specific constructions and arrangements shown and described, since various other modifications may occur to those ordinarily skilled in the art.

What is claimed is:

1. An apparatus for processing color video signals, comprising:
   means for receiving a plurality of primary-color-based three-component input signals;
   means for converting each of said three-component input signals to corresponding two-component signals based on hue and saturation levels, wherein said means for converting each of said input signals to corresponding hue and saturation signals comprises:

means for ordering said three-component signals into HIGH, MIDDLE and LOW signals according to relative magnitudes of said three components;

means for determining a hue value based on a comparison of HIGH minus LOW and MIDDLE minus LOW signals; and means for determining a saturation value based on a comparison of said LOW and HIGH signals;

means for modifying the hue or saturation levels of said two-component signals to produce modified two-component signals;

means for determining brightness factor corresponding to each of said input signals; and means for converting said modified two-component signals to three-component output signals using said brightness factor.

2. The apparatus of claim 1, wherein said hue value is determined from a look-up table having a pre-programmed hue value for each combination of HIGH minus LOW signal value, MIDDLE minus LOW signal value, and HIGH, MIDDLE, and LOW signal primary color combinations.

3. The apparatus of claim 1, wherein said saturation value is determined from a look-up table having a pre-programmed saturation value for each combination of HIGH and LOW signal values.

4. The apparatus of claim 1, wherein said saturation value is determined from calculating an inverse value derived from a LOW to HIGH signal ratio.

5. The apparatus of claim 1, wherein said brightness factor is determined from a ratio of said HIGH signal value to a predetermined maximum signal value.

6. The apparatus of claim 5, wherein signal values are represented on a scale of 0 to 100 IRE and said brightness factor is determined by dividing said HIGH signal value by 100.

7. The apparatus of claim 1, wherein said means for converting said modified two-component signals to three-component primary-color-based output signals using said brightness factor includes means for converting said two-component hue and saturation signals to normalize three-component primary color signals and means for multiplying each component of said normalized three-component signals by said brightness factor.

8. The apparatus of claim 7, wherein said normalized three-component primary color-based signals are determined from a normalization look-up table having a preprogrammed normalized three-component primary color-based signal value for each combination of a plurality of preselected hue and saturation values.

9. The apparatus of claim 8, wherein modification of said two-component hue and saturation signals is achieved by operator modification of values within said normalization look-up table.

10. The apparatus of claim 1, further including means for modifying said calculated brightness factor for selected ranges of hue and saturation values, said means for modifying said calculated brightness factor including:

means for receiving a set of ranges of hue and saturation values;

means for determining which ranges contain each of said two-component hue and saturation values;

means for receiving an input brightness factor for each range; and means for replacing said calculated brightness factor with said input brightness factor for each signal within each corresponding range.

11. A method for processing color video signals, comprising the steps of:

receiving a plurality of primary-color-based three-component input color signals;

converting each of said three-component input signals to corresponding two-component signals based on hue and saturation levels, wherein the step of converting each of said input signals to corresponding hue and saturation signals comprises the steps of:

ordering said three-component signals into HIGH, MIDDLE and LOW signals according to relative magnitudes of said three components;

determining a hue value based on a comparison of HIGH minus LOW and MIDDLE minus LOW signal; and determining a saturation value based on a comparison of said LOW and HIGH signals;

modifying the hue or saturation levels of said two-component signals to produce modified two-component signals;

determining a brightness factor corresponding to each of said input signals; and converting said modified two-component signals to three-component output signals using said brightness factor.

12. The method of claim 11, wherein said hue value is determined from accessing a look-up table having a pre-programmed hue value for each combination of HIGH minus LOW signal value, MIDDLE minus LOW signal values, and HIGH, MIDDLE, and LOW signal primary color combinations.

13. The method of claim 12, wherein said saturation value is determined from calculating an inverse value derived from a LOW to HIGH signal ratio.

14. The method of claim 11, wherein said saturation value is determined from accessing a look-up table having a pre-programmed saturation value for each combination of HIGH and LOW signal values.

15. The method of claim 11, wherein said brightness factor is determined from calculating a ratio of said HIGH signal value to a predetermined maximum signal value.

16. The method of claim 15, wherein signal values are represented on a scale of 0 to 100 IRE and said brightness factor is determined by dividing said HIGH signal value by 100.

17. The method of claim 11, wherein said step of converting said modified two-component signals to three-component primary-color-based output signals using said brightness factor is achieved by converting said two-component hue and saturation signals to normalized three-component primary color signals and multiplying each component of said normalized three-component signals by said brightness factor.

18. The method of claim 17, wherein said normalized three-component primary color-based signals are determined from accessing a normalization look-up table having a preprogrammed normalized three-component primary color-based signal value for each combination of hue and saturation values.

19. The method of claim 18, wherein modification of said two-component hue and saturation signals is achieved by receiving and storing operator modified values for said normalization look-up table.

20. The method of claim 11, further including the step of modifying said calculated brightness factor for selected ranges of hue and saturation values by:

receiving a set of ranges of hue and saturation values;

determining which ranges contain each of said two-component hue and saturation values;

receiving an input brightness factor for each range; and replacing said calculation brightness factor with said input brightness factor for each signal within each corresponding range.

* * * * *